US012652609B2

(12) United States Patent
Shapson et al.

(10) Patent No.: US 12,652,609 B2
(45) Date of Patent: Jun. 9, 2026

(54) PROVIDER EQUIPMENT IDENTIFICATION

(71) Applicant: Times Fiber Communications, Inc.,
Wallingford, CT (US)

(72) Inventors: Brian J. Shapson, Jackson, NJ (US);
Robert L. Romerein, Peterborough
(CA); Rong Hui Li, Brooklyn, NY
(US); Hai Qun Hong, Jiangxi (CN)

(73) Assignee: **TIMES FIBER
COMMUNICATIONS, INC.,**
Wallingford, CT (US)

( * ) Notice: Subject to any disclaimer, the term of this
patent is extended or adjusted under 35
U.S.C. 154(b) by 681 days.

(21) Appl. No.: 17/864,821

(22) Filed: Jul. 14, 2022

(65) Prior Publication Data

US 2023/0017123 A1      Jan. 19, 2023

Related U.S. Application Data

(60) Provisional application No. 63/221,576, filed on Jul.
14, 2021.

(51) Int. Cl.
H04H 20/78        (2008.01)
H04H 20/12        (2008.01)
H04W 48/10        (2009.01)

(52) U.S. Cl.
CPC .................................. H04W 48/10 (2013.01)

(58) Field of Classification Search
CPC ........ H04W 48/10; H04H 20/78; H04H 20/12
See application file for complete search history.

(56) References Cited

U.S. PATENT DOCUMENTS

| | | | |
|---|---|---|---|
| 9,960,842 B2 | 5/2018 | Zinevich | |
| 2008/0320541 A1* | 12/2008 | Zinevich | ................ H04N 17/00 |
| | | | 725/127 |
| 2014/0035694 A1* | 2/2014 | Narita | .................... H01Q 23/00 |
| | | | 333/17.1 |
| 2019/0110021 A1 | 4/2019 | Bailey | |

OTHER PUBLICATIONS

International Search Report and Written Opinion issued in International Application No. PCT/US2022/037077; Application Filing Date Jul. 14, 2022; Date of Mailing Oct. 24, 2022 (11 pages).
Ron Hranac, "Full Band Capture Revisited," A Technical Paper prepared for SCTE ISBE; 2020 Fall Technical Forum; Oct. 2020; pp. 1-46.

* cited by examiner

*Primary Examiner* — Joseph E Dean, Jr.
(74) *Attorney, Agent, or Firm* — CANTOR COLBURN LLP

(57) ABSTRACT

A provider equipment identification (ID) device includes a provider equipment with a plurality of output ports and an ID beacon device. The provider equipment is configured to perform a signal processing operation on an input signal and deliver an output signal to one or more of the output ports. The ID beacon device is coupled to the provider equipment. The ID beacon device is configured to output at least one pilot beacon signal which is receivable by each of the output ports to electrically excite each of the output ports such that the at least one pilot beacon signal is introduced in the output signal to generate an altered output signal capable of identifying the provider equipment.

21 Claims, 10 Drawing Sheets

PROVIDER EQUIPMENT IDENTIFICATION

CROSS-REFERENCE TO RELATED APPLICATIONS

This application claims priority to U.S. Provisional Application No. 63/221,576 filed Jul. 14, 2021, the contents of which are hereby incorporated by reference in its entirety.

BACKGROUND

Media provider operators have an interest in surveying the deployment of certain network equipment, particularly subscriber amplifiers or fiber optic nodes, installed throughout the community signal distribution system. For example, a CATV system operator may wish to expand its service capacity, and it may be desirable to determine whether a subscriber has equipment that can support frequencies of 1.2 gigahertz (GHz), or beyond and/or or if that subscriber has an older model amplifier that will only support a bandwidth of 1 GHz.

SUMMARY

The disclosure relates generally to the identification of provider equipment, and more specifically, to provider equipment including an identification (ID) beacon circuit to identify the provider equipment.

According to a non-limiting embodiment, a provider equipment identification (ID) device includes a provider equipment and an ID beacon device. The provider equipment includes a plurality of output ports and is configured to perform a signal processing operation on an input signal and deliver an output signal to one or more of the output ports. The ID beacon device is coupled to the provider equipment. The ID beacon device is configured to output at least one pilot beacon signal which is receivable by each of the output ports to electrically excite each of the output ports such that the at least one pilot beacon signal is introduced in the output signal to generate an altered output signal capable of identifying the provider equipment.

In accordance with one or more non-limiting embodiments, the output signal includes a guard band, wherein the pilot beacon signal is located in the guard band.

In accordance with one or more non-limiting embodiments, the ID beacon device further comprises an oscillator, a filter circuit in signal communication with the oscillator, and an antenna in signal communication with the filter circuit. The oscillator is configured to generate a pulse signal. The filter circuit is configured to remove harmonics from the pulse signal and to output a filtered pulse signal in response to removing the harmonics. The antenna is in signal communication with the filter circuit and is configured to broadcast the pilot beacon signal in response to receiving the filtered pulse signal.

In accordance with one or more non-limiting embodiments, the filter circuit is a low-pass filter including an input connected to the oscillator and an output connected to the antenna.

In accordance with one or more non-limiting embodiments, the filter circuit is a band-pass filter including an input connected to the oscillator and an output connected to the antenna.

In accordance with one or more non-limiting embodiments, the filter circuit is a ceramic resonator including an input connected to the oscillator and an output connected to the antenna.

In accordance with one or more non-limiting embodiments, the provider equipment further comprises a bi-directional amplifier configured to define the guard band in the output signal.

In accordance with one or more non-limiting embodiments, the bi-directional amplifier comprises a first diplex filter, a second diplex filter, a first amplifier, and a second amplifier. The first diplex filter is in signal communication with an input port of the provider equipment. The second diplex filter is in signal communication with the output ports of the provider equipment. The first amplifier is configured to establish signal communication between the first diplex filter and the second diplex filter in a first direction. The second amplifier is configured to establish signal communication between the first diplex filter and the second diplex filter in a second direction opposite the first direction.

In accordance with one or more non-limiting embodiments, the signal processing operation includes amplifying the input signal.

In accordance with one or more non-limiting embodiments, the provider equipment includes a cable television (CATV) amplifier.

According to another non-limiting embodiment, a cable television (CATV) amplifier identification (ID) device comprises a drop amplifier and an ID beacon device. The drop amplifier includes an input port configured to receive an input signal, a passive output port in signal communication with the input port to receive the input signal, and a bi-directional amplifier including an amplifier input and an amplifier output. The amplifier input is connected to the input port and the passive output port, and an amplifier output connected to the one or more active output ports. The ID beacon device is coupled to the drop amplifier, and is configured to wirelessly broadcast a pilot beacon signal which electrically excites the one or more active output ports.

In accordance with one or more non-limiting embodiments, the bi-directional amplifier is configured to generate an output signal in response to amplifying the input signal and to deliver the output signal to the one or more active output ports.

In accordance with one or more non-limiting embodiments, exciting the one or more active ports introduces the pilot beacon signal in the output signal to generate an altered output signal.

In accordance with one or more non-limiting embodiments, the bi-directional amplifier defines a guard band in the output signal, and the pilot beacon signal is located in the guard band.

In accordance with one or more non-limiting embodiments, the bi-directional amplifier comprises a first diplex filter, a second diplex filter, a first amplifier, and a second amplifier. The first diplex filter is in signal communication with an input port of the provider equipment. The second diplex filter is in signal communication with the output ports of the provider equipment. The first amplifier is configured to establish signal communication between the first diplex filter and the second diplex filter in a first direction. The second amplifier is configured to establish signal communication between the first diplex filter and the second diplex filter in a second direction opposite the first direction.

In accordance with one or more non-limiting embodiments, the ID beacon device further comprises an oscillator, a filter circuit, and an antenna. The oscillator is configured to generate a pulse signal. The filter circuit is in signal communication with the oscillator. The filter circuit is configured to remove harmonics from the pulse signal and to output a filtered pulse signal in response to removing the harmonics. The antenna is in signal communication with the filter circuit and is configured to broadcast the pilot beacon signal in response to receiving the filtered pulse signal.

In accordance with one or more non-limiting embodiments, the filter circuit is a low-pass filter including an input connected to the oscillator and an output connected to the antenna.

In accordance with one or more non-limiting embodiments, the filter circuit is a band-pass filter including an input connected to the oscillator and an output connected to the antenna.

In accordance with one or more non-limiting embodiments, the filter circuit is a ceramic resonator including an input connected to the oscillator and an output connected to the antenna.

According to yet another non-limiting embodiment, a provider equipment identification (ID) device includes a provider equipment including a plurality of output ports and an ID beacon device coupled to the provider equipment. The provider equipment is configured to perform a signal processing operation on an input signal and to deliver an output signal including at least one guard band to one or more of the output ports. The ID beacon device is configured to output at least one pilot beacon signal. The at least one pilot beacon signal is located within the at least one guard band and is encoded to indicate at least one characteristic of the provider equipment.

According to still another non-limiting embodiment, a method of identifying a provider equipment comprises delivering an input signal to a provider equipment including a plurality of output ports. The method further comprises performing, by the provider equipment, a signal processing operation on the input signal and delivering an output signal to one or more of the output ports. The method further comprises wirelessly broadcasting, by an ID beacon device coupled to the provider equipment, a pilot beacon signal that electrically excites each of the output ports. The method further comprises introducing the pilot beacon signal in the output signal to generate an altered output signal, wherein the pilot beacon signal identifies the provider equipment.

In accordance with one or more non-limiting embodiments, the method further comprises defining a guard band in the output signal using the provider equipment, and locating the pilot beacon signal in the guard band.

Additional technical features and benefits are realized through the techniques of the present disclosure. Embodiments and aspects of the present disclosure are described in detail herein. For a better understanding, refer to the detailed description and to the drawings.

BRIEF DESCRIPTION OF THE DRAWINGS

The foregoing and other features of the embodiments are apparent from the following detailed description taken in conjunction with the accompanying drawings in which.

Figure 1:
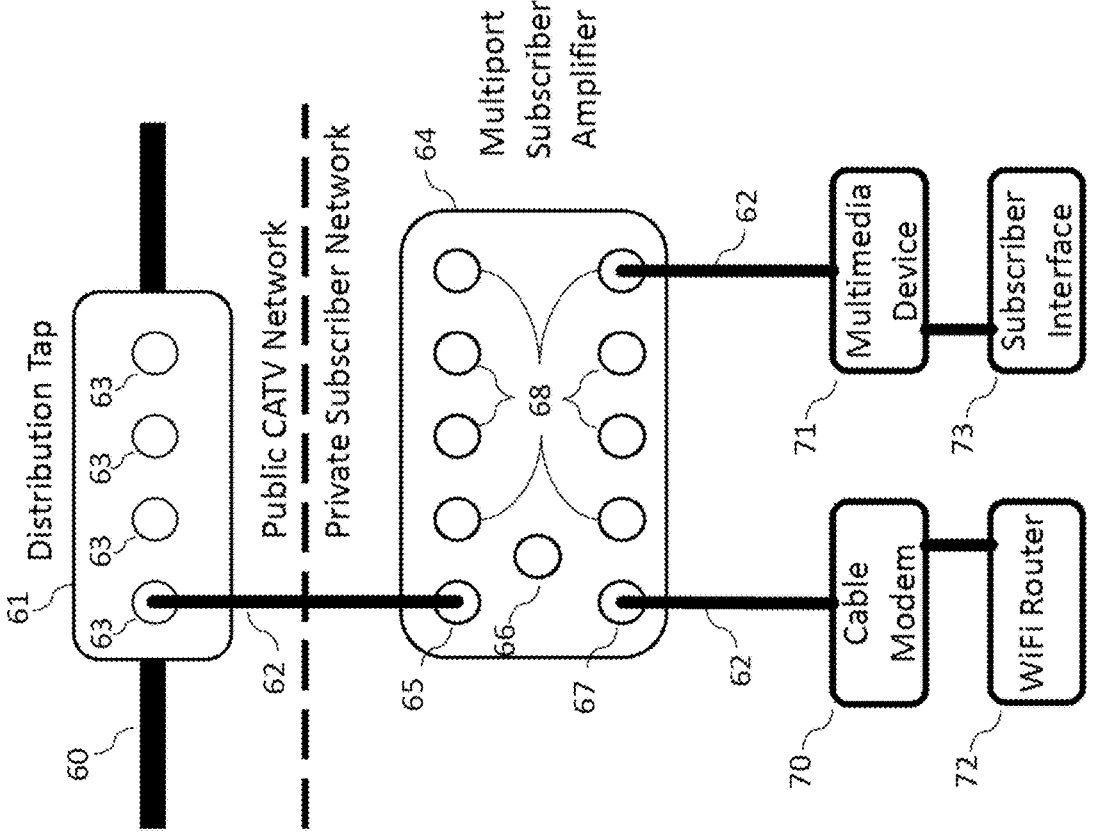
FIG. 1 is a block diagram depicting electrical connection between a public CATV network and private subscriber network according to a non-limiting embodiment.

The diagrams depicted herein are illustrative. There can be many variations to the diagrams or the operations described therein without departing from the spirit of the disclosure. For instance, the actions can be performed in a differing order or actions can be added, deleted or modified. Also, the term "coupled" and variations thereof describes having a communications path between two elements and may include a direct connection between the elements with no intervening elements or connections between them or an indirect connection with, for example, one or more intervening elements or connections. All of these variations are considered a part of the specification. It should also be appreciated that that features from one embodiment can be combined with features from one or more other embodiments described herein.

In the accompanying figures and following detailed description, the various elements illustrated in the figures are provided with two or three digit reference numbers.

DETAILED DESCRIPTION

Various embodiments are described herein with reference to the related drawings. Alternative embodiments can be devised without departing from the scope of this disclosure. Various connections and positional relationships (e.g., over, below, adjacent, first direction, second direction, etc.) are set forth between elements in the following description and in the drawings. These connections and/or positional relationships, unless specified otherwise, can be direct or indirect, and the disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." The various non-limiting embodiments or designs described herein are "exemplary" and not necessarily to be construed as preferred or advantageous over other embodiments or designs. The terms "at least one" and "one or more" include any number greater than or equal to one, e.g., one, two, three, four, etc. The terms "a plurality" include any number greater than or equal to two, e.g., two, three, four, five, etc. The term "connection" includes both an indirect connection and a direct connection.

The terms "about," "substantially," "approximately," and variations thereof, are intended to include the degree of error associated with measurement of the particular quantity based upon the equipment available at the time of filing the application.

Turning now to an overview of technologies relevant to aspects of the disclosure, media provider operators have relied on installation records personally submitted by field technicians to track deployed active provider equipment, though these installation records may contain errors and/or be susceptible to human error. Consequently, media provider operators may need to dispatch a technician to a consumer's residence (sometime referred to as a "truck rollouts") to physically inspect an active provider equipment for identification, which results in substantial overhead costs.

In some embodiments, a programmable circuit element may detect a signature or alteration of the transmission or reflection at any port of a downstream network device (e.g., CATV modems, set-top boxes, media servers, etc.). FIG. 1, for example, illustrates the coexistence of a public CATV network in signal communication with a private subscriber network. The public CATV network includes a distribution tap 61, while the private subscriber network includes a provider equipment 64 such as, for example, a multiport drop amplifier. The provider equipment 64 can be connected to one or more passive or active downstream devices such as, for example, a cable modem 70, a multimedia device 71, a Wi-Fi router 72, and/or a subscriber interface 73.

The distribution tap 61 receives a broad spectrum of signals via coaxial cables 60 (in other examples, the signals may be delivered via other medium, such as, by way of non-limiting example, fiber optics). The distribution tap 61 extracts a portion of the signal energy for each subscriber connected to the distribution tap ports 63 via coaxial cables 62, which may be smaller than coaxial cables 60. In some examples, the tap ports 61 are isolated from each other by more than 20 dB due to the nature of the tap circuit 61.

The provider equipment 64 includes an input port 65, a power port 66, a passive output port 67, and one or more active output ports 68. A cable modem 70 may be found at most subscriber locations to facilitate operation of a Wi-Fi router 72. The cable modem 70 can be connected to any output port and still operate as required, though the cable modem 70 may often be connected to the passive output port 67 to ensure that communication is possible in the event of a power outage where the modem can still communicate with the head end without power to the amplifier. Other amplifier ports 68, distribute services through Multimedia Devices 71, such as set-top boxes, for example, which facilitate operation of various subscriber interface devices 73 such as, for example, televisions.

Figure 2:
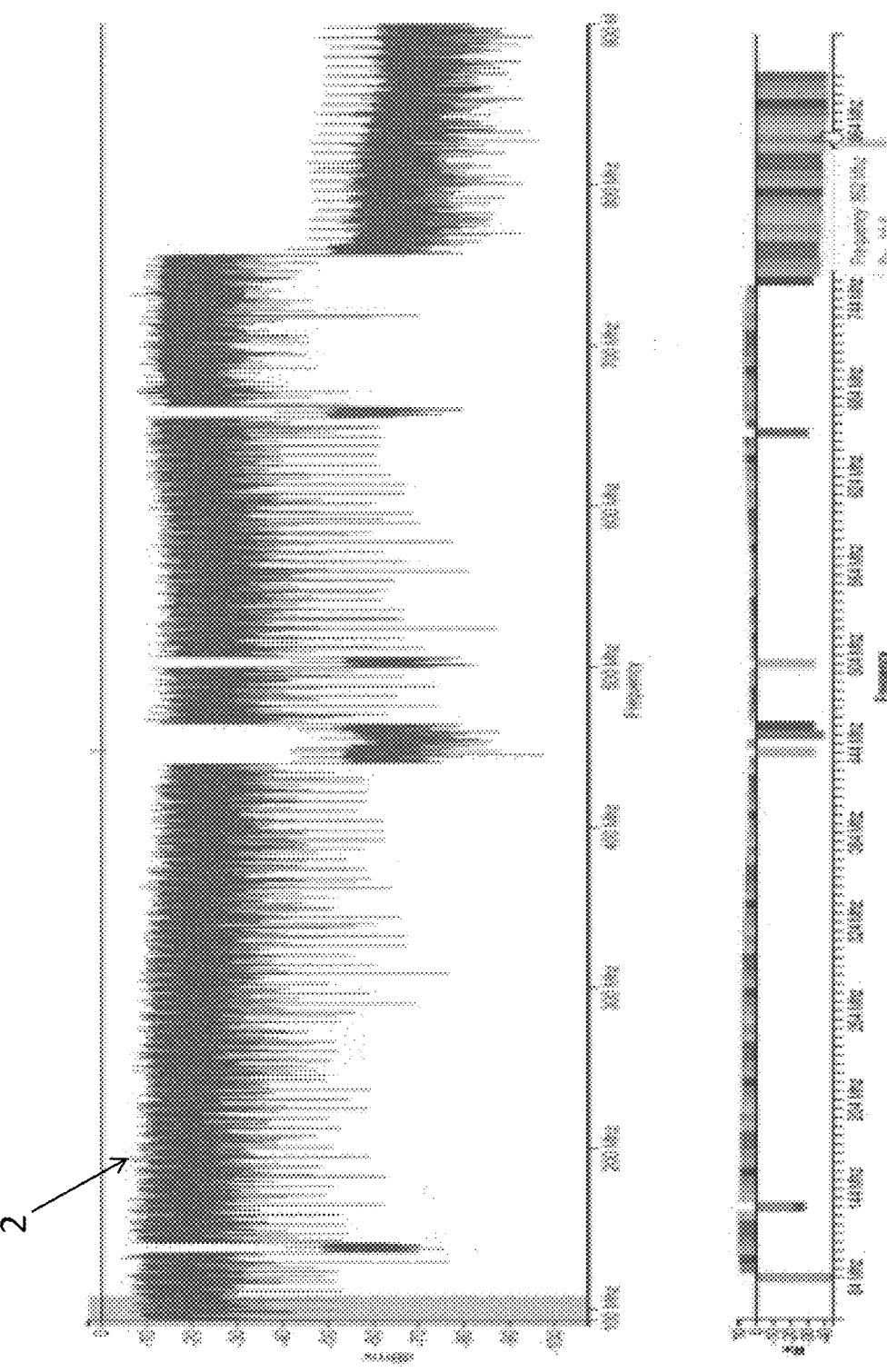
FIG. 2 depicts a channel map 2 generated by a provider equipment and appearing at a downstream device connected to the provider equipment according to a non-limiting embodiment.

FIG. 2 illustrates a channel map appearing at a downstream device such as, for example, a cable modem. As described above, the cable modem can be connected to the passive port such that the channel map transmitted therethrough can be detected and sent back upstream through the distribution tap and to a CATV signal distribution center known as the "headend." Therefore, a signature can be applied to the passive port and detected in the channel map of the signal transmitted to the passive device connected to the passive port.

It is difficult, however, to produce a signature on all the output ports (e.g., the passive port along with one or more of the active ports dedicated to carrying media data to downstream devices) of multiport devices (e.g., four or eight output amplifiers) without impacting the performance of the devices and/or the quality of the media signal output from the provider equipment (e.g., the subscriber amplifier). Accordingly, it may be desirable to output a media signal to all output ports of a provider equipment, which can identify the provider equipment without impacting the performance of the equipment and/or the quality of the output media signal.

One or more embodiments provide a provider equipment identification (ID) device comprising a provider equipment that includes an ID beacon device. The ID beacon device outputs a detectable pilot beacon signal, which is indicative of the provider equipment and produces an alteration of the transmission or reflection at one or more ports of a downstream media device (for example, all of the ports of the downstream media device).

In one or more non-limiting embodiments, the ID beacon device can be implemented as a low-footprint device that is coupled to the provider equipment, but does not modify the construction of the provider equipment because it is not physically connected to any port. For example, the ID beacon device may be physically located within or outside a housing of the provider equipment. In one or more non-limiting embodiments, the ID beacon device can be a stand-alone device that is coupled to the provider equipment after initial fabrication of the provider equipment. For example, the ID beacon device is coupled to the power supply of the provider equipment but is separate and physically disconnected from the main circuitry of the provider equipment. In other non-limiting embodiments, the ID beacon device is coupled to the provider equipment as an integrated circuit (IC) that is fabricated at the same time along with the provider equipment. In one or more non-limiting embodiments, the provider equipment includes a multi-port media device, which includes a passive output port and one or more active output ports configured to deliver therethrough an output media signal. The output media signal can be defined by a radio spectrum that includes a "guard band" that defines an unused part located between first and second radio bands of the radio spectrum (e.g., between upstream and downstream spectrums) where commercial signals are not present.

In one or more non-limiting embodiments, the ID beacon device wirelessly broadcasts the pilot beacon signal, which is wirelessly received at any of the provider equipment output ports. The pilot beacon signal electrically excites a respective output port of the provider equipment output ports, which in turn introduces the pilot beacon signal in the guard band and does not alter the portions of the output signal containing data to be processed by one or more downstream devices and does not negatively impact the quality of the output signal. In one or more non-limiting embodiments, the pilot beacon signal is wirelessly broadcast by the ID beacon and is simultaneously received, or received substantially simultaneously, by all the output ports included in a subscriber device.

In one or more non-limiting embodiments, the altered signal can be delivered to a pilot beacon signal detection unit, which performs one or more signal processing operations to extract the pilot beacon signal from the altered transmission signal. The pilot beacon signal detection unit can be included, for example, in the downstream device, at the CATV headend, and/or other locations capable of receiving the output signal delivered to a downstream device and performing signal extraction processing. In any case, the extracted signal can then be analyzed, for example, to identify the type, location, and/or other various types of information corresponding to the provider equipment.

This disclosure may provide a cost-effective way to remotely identify information (e.g., particular models or types of provider equipment, location of provider equipment, etc.) based on the pilot beacon signal extracted from the altered output signal output from the customer's provider equipment without requiring physical inspection of the provider equipment by a technician. In this manner, activities involved with dispatching truck rolls can be substantially reduced.

Figure 3:
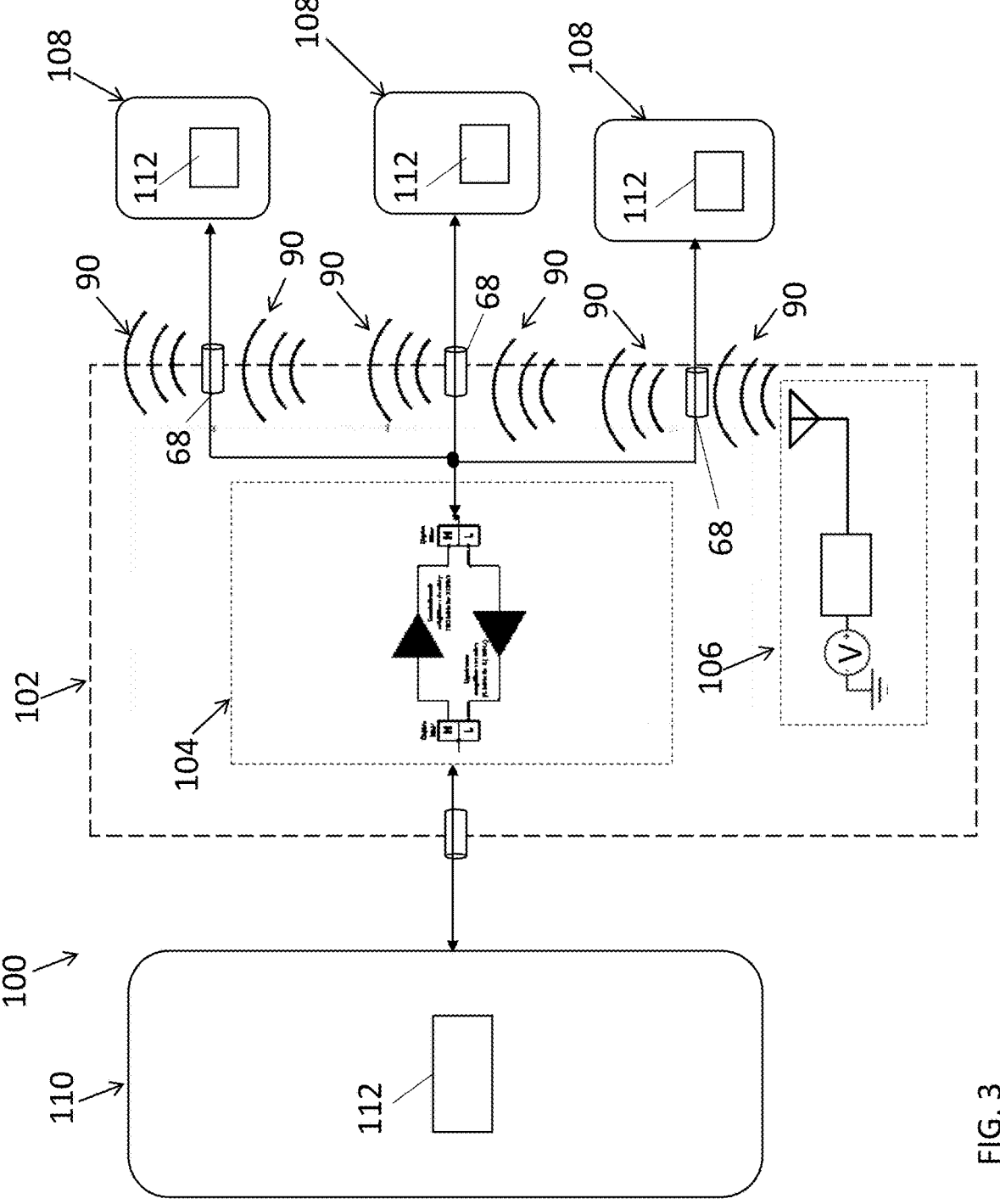
FIG. 3 is a block diagram depicting a provider equipment ID system according to a non-limiting embodiment.

With reference now to FIG. 3, a provider equipment identification (ID) system 100 is illustrated according to a non-limiting embodiment. The provider equipment ID system 100 includes a provider equipment ID device 102 connected to a network headend 110, and a downstream device 108 connected to the provider equipment ID device 102. The provider equipment ID device 102 includes a provider equipment 104 and an ID beacon device 106.

In one or more non-limiting embodiments, the provider equipment 104 includes a type of media equipment such as, for example, a cable television drop amplifier. The provider equipment 104 receives an input signal at an input port and may be configured to modify the input signal or pass through the input signal without modification. The provider equipment 104 delivers an output signal to one or more downstream devices 108 via one or more output ports 68. According to a non-limiting embodiment, the provider equipment 104 is implemented as a CATV drop amplifier. The CATV drop amplifier receives an input signal and provides signal gain to produce an output signal having boosted strength (e.g., an increase in strength of up to 32 times or more). The output signal can then be delivered to the downstream provider equipment via one or more output ports 68 of the CATV drop amplifier.

The ID beacon device 106 is configured to output a pilot beacon signal 90, which is capable of identifying the provider equipment. Although a single ID beacon device 106 is shown, it should be appreciated that additional ID beacon devices 106 can be included with the provider equipment 104 without departing from the scope of the invention. For example, the provider equipment 104 can include two ID beacon devices 106, each which outputs its own pilot beacon signal 90 at different frequencies. In this manner, multiple pilot beacon signals (e.g., one pilot beacon signal corresponding to a first ID beacon device and a second pilot beacon signal corresponding to a second ID beacon device) can be included at different positions in the guard band 92.

In one or more non-limiting embodiments, the pilot beacon signal identifies one or more aspects or characteristics of the provider equipment 104, such as, by way of non-limiting example, a device ID number, the type of the provider equipment 104, the version of the equipment 104, device specifications of the provider equipment 104, etc.

The pilot beacon signal 90 as described herein electrically excites the output ports 68 of the provider equipment 104 by radiating the electrical components (e.g., wires, traces, capacitors, resistors, inductors, etc.) coupled to each respective output port 68. Electrically exciting a respective output port 68 effectively injects a signature at a respective output port 68, which in turn induces the production of the pilot beacon signal 90 in the respective guard band 92 and generate an altered output signal.

A pilot beacon signal 90 located in a respective guard band 92 can be detected in the altered spectrum that appears at the transmission or reflection of a corresponding input port included on the downstream device 108. In one or more non-limiting embodiments, the ID beacon device 106 can be implemented as a low-footprint (e.g., smaller in one or more dimension (e.g., height, length, width, volume, etc.) than the provider equipment 104), and coupled to the provider equipment 104 without modifying the construction of the provider equipment 104 because it is not physically connected to any of the provider equipment output ports 68.

In one or more non-limiting embodiments, the ID beacon device 106 broadcasts the pilot beacon signal 90 in a guard band 92 defined by upstream and downstream spectrums where commercial signals are not present, and the pilot beacon signal 90 can be generated at frequency that falls within the frequency band of the guard band 92. For example, if the guard band 92 is defined as a frequency band ranging from 45 MHz to 55 MHz, the beacon pilot signal 90 can be generated at about 50 MHz such that it is located within the guard band 92.

In one or more non-limiting embodiments, the output of the ID beacon device 106 is constructed as an inverse multiplexer and is coupled to all of the output ports 68 of the provider equipment 104. Accordingly, the ID beacon device 106 can output one or more pilot beacon signal to one or more selected output ports 68 without outputting the pilot beacon signal to one or more non-selected output ports 68.

The downstream device 108 may include one or more downstream input ports and may also include one or more downstream output ports. At least one of the downstream input ports is in signal communication with one or more of the output ports of the provider equipment 104 to receive the altered output signal. The downstream device 108 can include, but is not limited to, a cable modem and a set-top box, and is configured to translate the output signal received from the provider equipment 104 into a signal that can be utilized by a consumer's local device such as, for example, a computer, television, etc.

According to a non-limiting embodiment, the downstream device 108 is configured to deliver the altered output signal to a pilot beacon signal detection unit 112. The pilot beacon signal detection unit 112 can be included locally with the downstream device 108, at the network headend 110, and/or another location capable of receiving the output signal for analysis. The pilot beacon signal detection unit 112 is configured to perform one or more signal processing operations to extract the pilot beacon signal from the altered signal. The extracted pilot beacon signal can then be analyzed to identify an aspect of the provider equipment 104, such as, but not by way of limitation, the type and location of the provider equipment 104.

In one or more non-limiting embodiments, the downstream device 108 can include a receiver IC, which is programmed to return data to the headend 110. A pilot beacon signal detection unit 112 at the headend 110 can then perform a spectrum analysis of a cable subscriber's media package using various spectral analyzer software packages.

The view of the cable subscriber media package spectrum can show impairments including, but not limited to, ingress, frequency response problems, the presence of filters, and incorrect narrowcast versus broadcast signal levels. In this manner, a pilot beacon signal located in the guard band can be identified remotely without dispatching a truck roll-out.

In one or more non-limiting embodiments, a full-band capture analysis can be performed by the pilot beacon signal detection unit 112 to identify characteristics in the subscriber spectrum. The full-band capture analysis can utilize software code to automate the interpretation of the spectrum from signal impairments to the frequency and amplitude of individual signals, and in turn identify and extract the pilot beacon signal 90. In one or more non-limiting embodiments, the extracted pilot beacon signal 90 can be further analyzed to decode the information produced by a modulated pulse signal and determine various types of information indicating various aspects or characteristics of the provider equipment 104.

Figure 4:
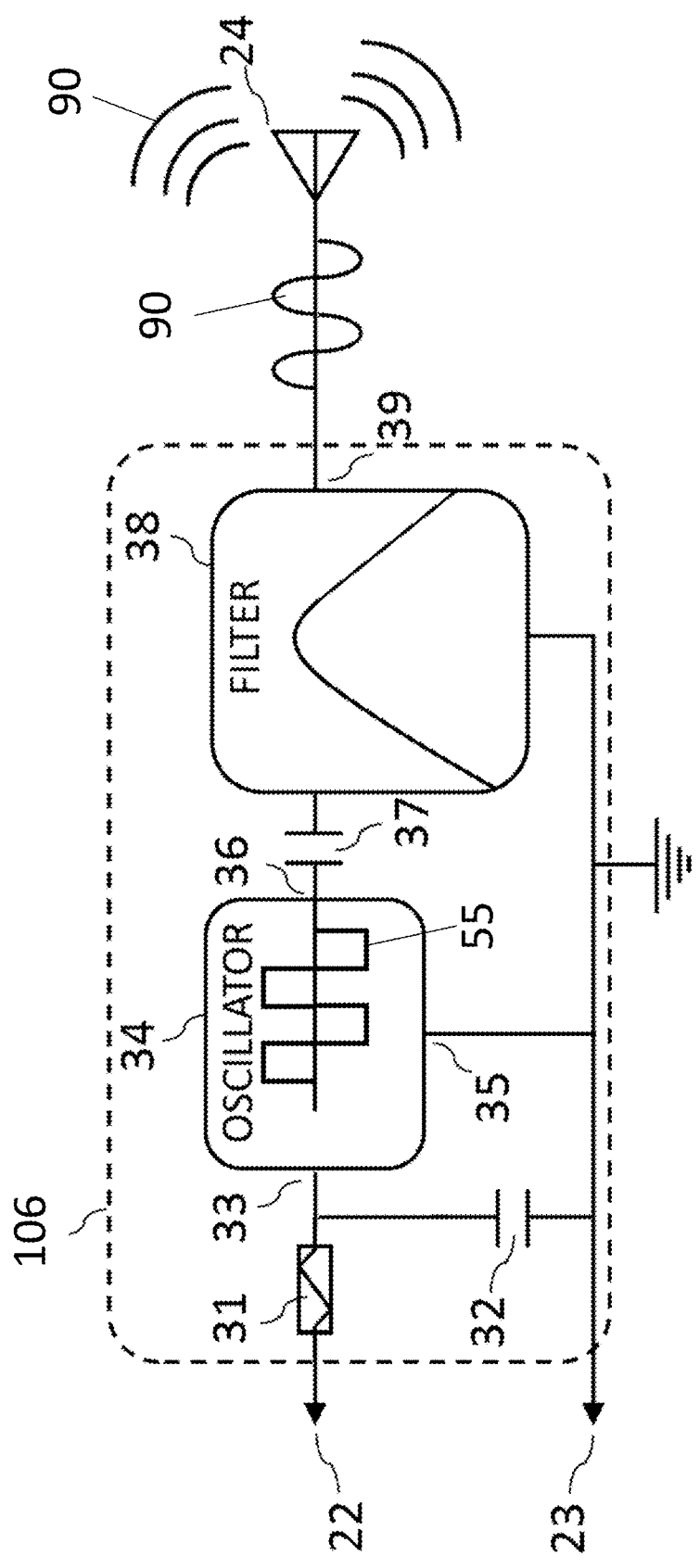
FIG. 4 is a block diagram depicting an ID beacon device included in a provider equipment ID system according to a non-limiting embodiment.
Figure 5:
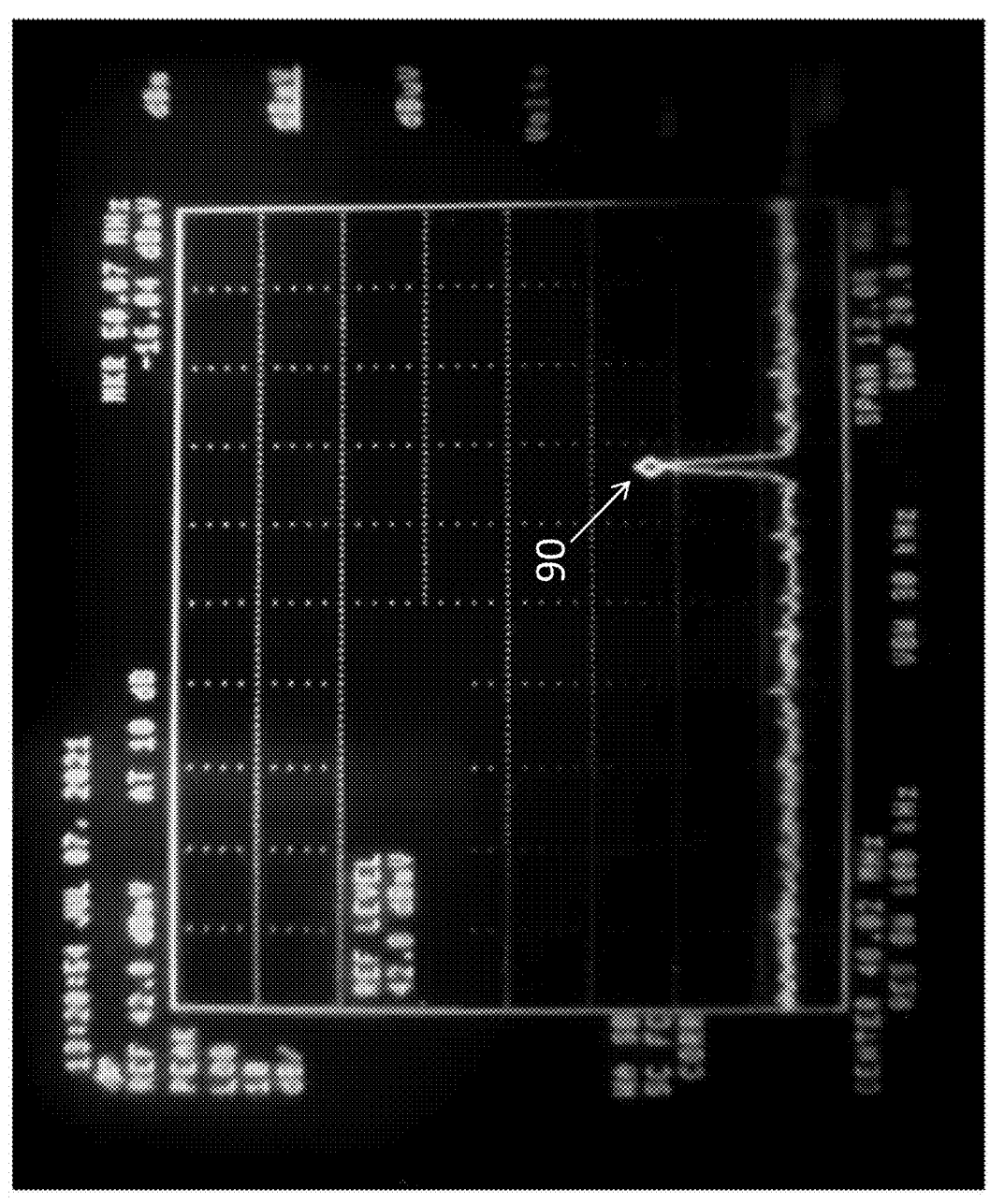
FIG. 5 is a signal diagram depicting a pilot beacon signal generated by an ID beacon device according to a non-limiting embodiment.

Turning now to FIG. 4, an ID beacon device 106 included in a provider equipment ID system 102 is illustrated according to a non-limiting embodiment. The ID beacon device 106 is configured to generate a pilot beacon signal 90 that appears at one or more output ports (for example, all of the output ports) of a multi-port provider equipment (e.g., the drop amplifier shown in FIG. 1). FIG. 5, for example, illustrates a pilot beacon signal 90 generated at 50 megahertz (MHz) and detected at an output port of a provider equipment 104. It should be appreciated that the pilot beacon signal 90 can be generated at different frequencies depending on the system architecture or media network.

The ID beacon device 106 illustrated in FIG. 4 includes an oscillator integrated circuit 34 (referred herein as an "oscillator" 34), a filter 38 and an antenna 24. The oscillator 34 includes a power pin 33 to receive power, a ground pin 35 to realize a ground reference 23, and an output pin 36 to output a pulse signal 55. A resistor 31 drops the supply voltage from the amplifier to match the voltage requirement of the oscillator 34. Capacitor 32 is a large enough value (e.g., about 0.1 µF or greater) to ensure that the voltage at pin 33 is stable and free from any radio frequency energy. The oscillation frequency of the oscillator 34 can be pre-tuned in production or can be determined by external components.

The pulse signal 55 generated by the oscillator 34 radiates (e.g., excites) an antenna 24 to generate the pilot beacon signal 90. In one or more non-limiting embodiments, the pulse signal 55 can be modulated to indicate various types of information indicating various aspects or characteristics of the provider equipment 104. The types of equipment information can include, but is not limited to, device ID number, the type of the equipment 104, the version of the equipment 104, and the device specifications of the equipment 104. In turn, the modulated pulse signal 55 effectively generates a pilot beacon signal 90 that is encoded with the types of equipment information described above.

In one or more non-limiting embodiments, the oscillator 34 can generate different pulse signals 55 at different time periods. For example, a first pulse signal having a first frequency can be generated at a first time period (T), while a second pulse signal having a second frequency (e.g., a different from the first frequency) can be generated at a second period (T2). In this manner, two different pilot beacon signals can be generated and located in the same guard band or two different pilot beacon signals can be located in a respective guard band, where each pilot beacon signal can identify a different characteristic or different information corresponding to the provider equipment 104.

According to one or more non-limiting embodiments, the oscillator 34 can be implemented as a SUNTSU Ceramic SMT 4 Pad CMOS oscillator, which produces a square wave 55 composed of a fundamental frequency plus odd harmonic frequencies at the antenna pin 37. To remove the odd harmonics from the fundamental oscillator frequency and/or to suppresses odd harmonics higher in frequency than the fundamental frequency, the pulse signal 55 passes through the filter 38 to generate a filtered pulse signal that radiates through the antenna 24.

Figure 6:
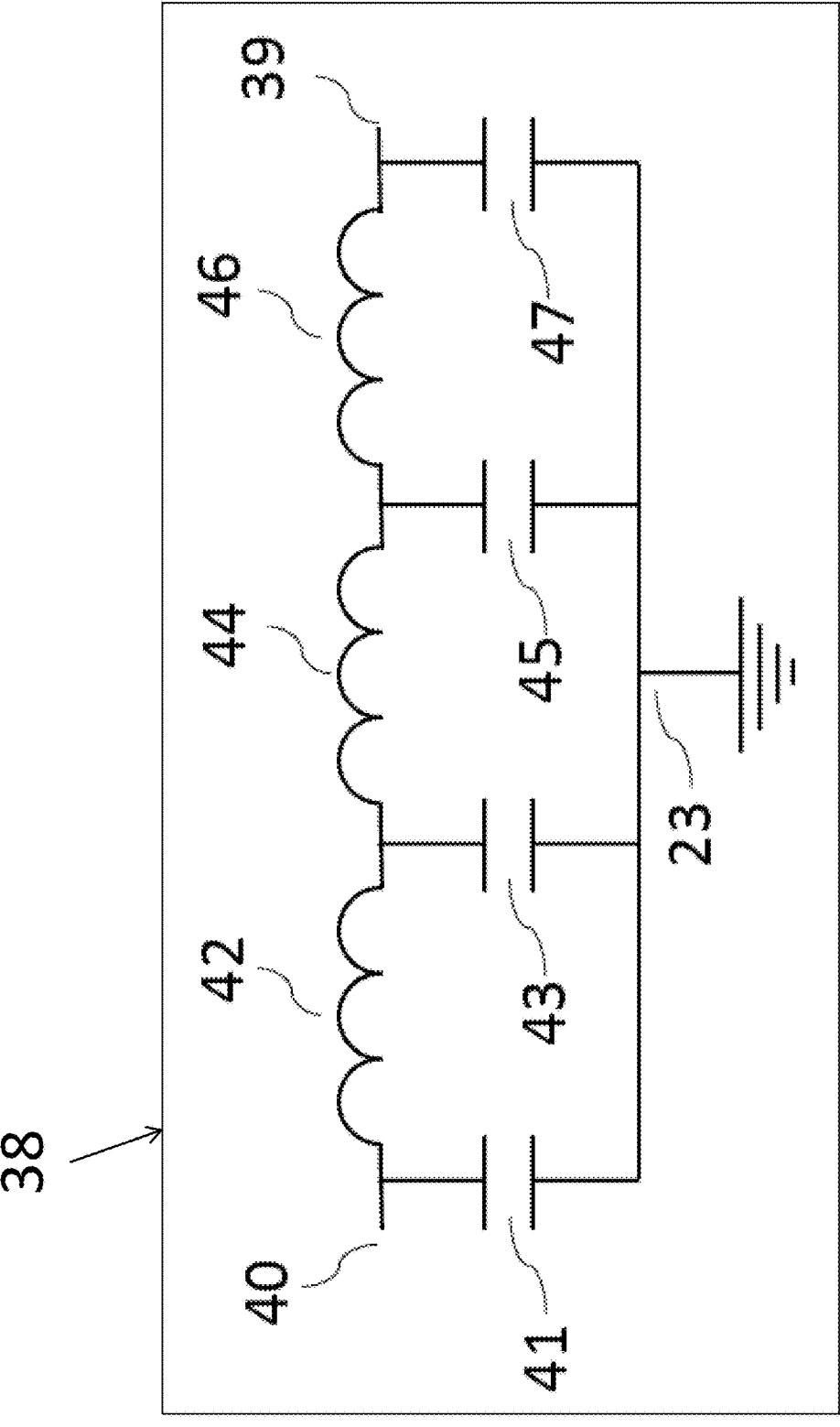
FIG. 6 is a schematic diagram of a filter circuit included in an ID beacon device according to a non-limiting embodiment.

In one or more non-limiting embodiments, the filter 38 can be implemented as low-pass filter or a band-pass filter. An example of a low-pass filter 38 than can be implemented in the ID beacon device 106 is shown in FIG. 6. The low-pass filter 38 includes an input 40, a first inductor 42, a second inductor 44, a third inductor 46, a first capacitor 42, a second capacitor 43, a third capacitor 45, a fourth capacitor 47, and an output 39. A first terminal of the first capacitor 41 and a first terminal of the first inductor 42 are each connected in common with the input 40. A second terminal of the second inductor 42 is connected in common with a first terminal of the second capacitor 43 and a first terminal of the second inductor 44. The opposing second terminal of the second inductor 44 is connected in common with a first terminal of the third capacitor 45 and a first terminal of the third inductor 46. The opposing second terminal of the third inductor 46 is connected in common with the first input of the fourth capacitor 47 and the output 39. The opposing second terminals of each of the first capacitor 41, second capacitor 43, third capacitor 45, and fourth capacitor 47 are connected in common with a ground reference 23.

With continued reference to FIG. 4, input to the low-pass filter 38 through capacitor 37 provides a high-pass input to remove low frequency noise. The filter 38 is configured to define the guard band in which the pilot beacon signal is located. For example, a cut-off frequency of the filter 38 can be designed slightly above the guard band upper frequency. Accordingly, the pilot beacon signal 90 having a maximum amplitude can be positioned within the guard band as described in greater detail below.

Figure 7:
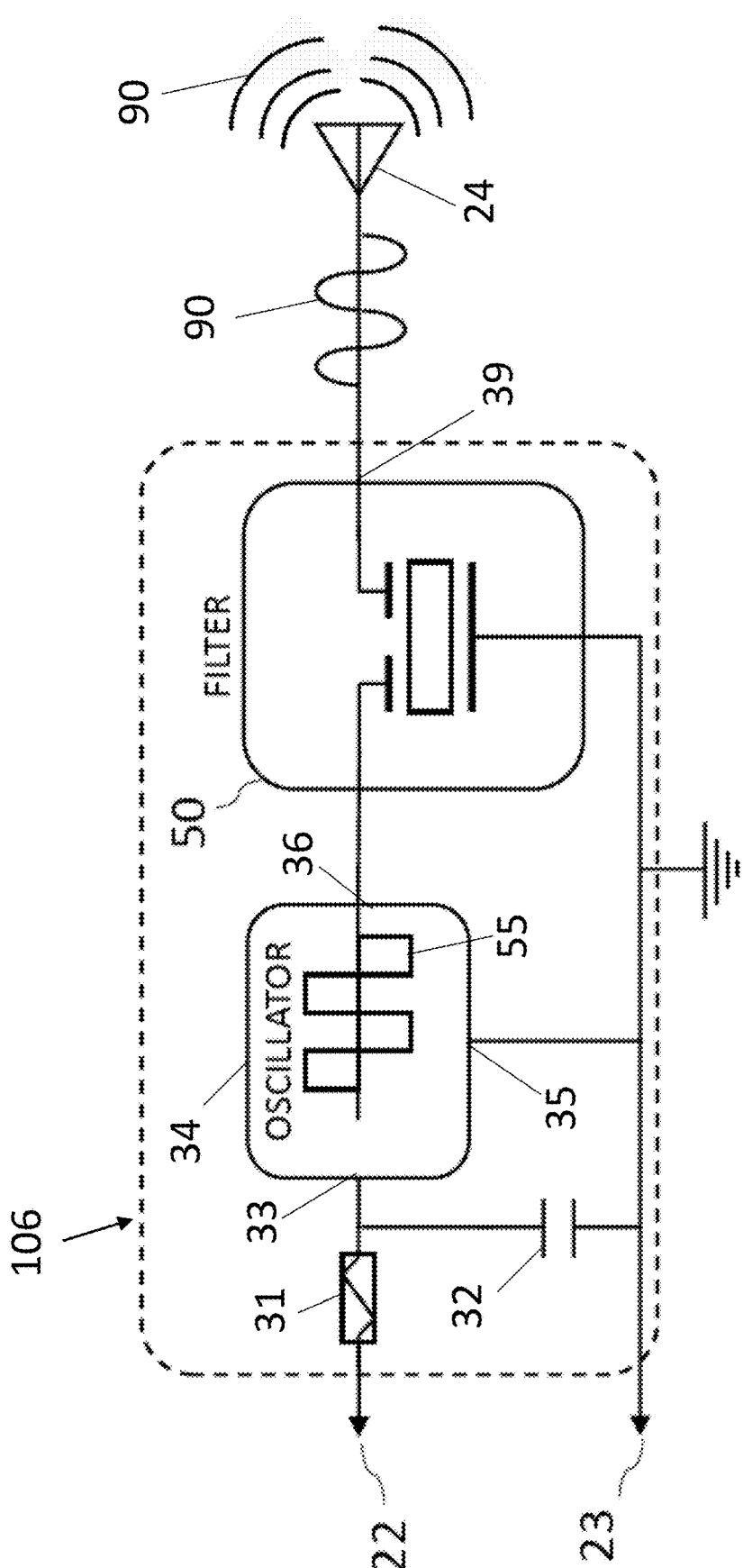
FIG. 7 is a block diagram depicting an ID beacon device included in a provider equipment ID system according to another non-limiting embodiment.

Although a low-pass filter or band-pass filter is described above, it should be appreciated by those skilled in the art that other RF filter circuits can be used. For example, but not by way of limitation, the RF filter circuit may be one that is capable of achieving low insertion loss (about 3 decibels or less) at the fundamental frequency and high insertion loss (about 42 decibels or greater) at the odd harmonics above the fundamental frequency can be implemented in the ID beacon device 106. Referring to FIG. 7, for example, the ID beacon device 106 is illustrated according to another non-limiting embodiment. The ID beacon device 106 illustrated in FIG. 7 operates in substantially the same manner as the ID beacon device 106 described in FIG. 5, but replaces the filter 38 with a ceramic resonator 50.

Figure 8:
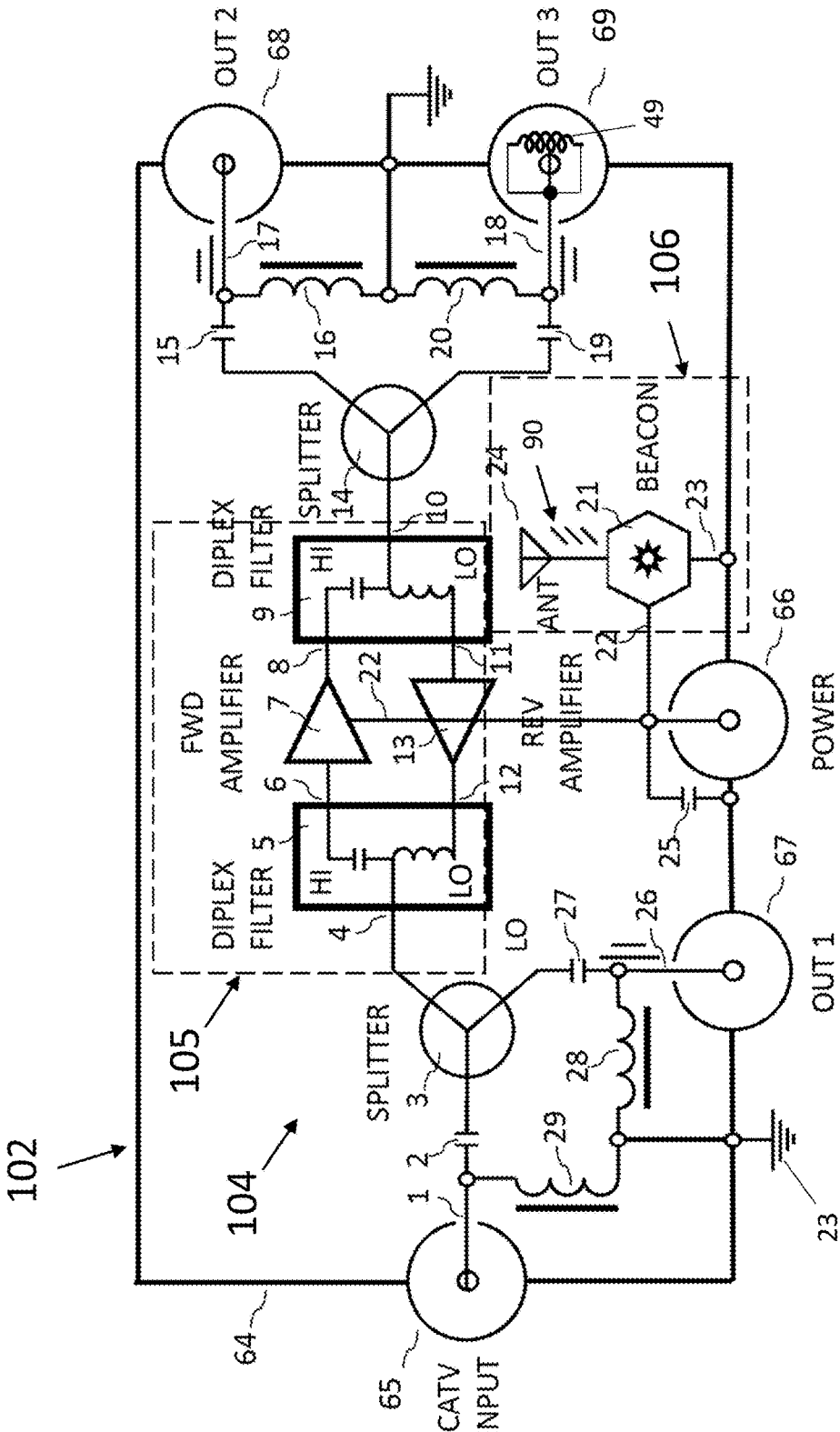
FIG. 8 is a schematic diagram of a provider equipment implemented as a drop amplifier included in a provider equipment ID system according to a non-limiting embodiment.

Turning now to FIG. 8, a schematic diagram depicts a provider equipment ID system 102 according to a non-limiting embodiment. The provider equipment ID system 102 is illustrated implementing a drop amplifier as an example of a provider equipment 104 described herein. The drop amplifier 104 includes of a CATV input port 65, connected to the input of a two-way splitter 3, via a conductive path 1 and a coupling capacitor 2, and a plurality of downstream device output ports 67, 68 and 69. Although three downstream device output ports 67, 68 and 69 are shown, it should be appreciated that the drop amplifier 104 can include more or less downstream device output ports 67, 68 and 69. An inductor 29 connects conductive path 1 to ground 23 for surge protection of the input port 65 and to tune the high-pass cut-off frequency of the input port below a target frequency such as, for example, 5 MHz.

The drop amplifier 104 further includes bi-directional amplifier 105. The bi-directional amplifier 105 includes a first diplex filter 5, a first amplifier 7, a second diplex filter 9, and a second amplifier 13. The first amplifier 7 is configured to establish signal communication between the first diplex filter 5 and the second diplex filter 9 in a first direction, while the second amplifier 13 is configured to establish signal communication between the first diplex filter 5 and the second diplex filter 9 in a second direction opposite the first direction. For example, the first amplifier 7 can be referred to as a forward amplifier 7 configured to establish signal communication from the first diplex filter 5 to the second diplex filter 9, while the second amplifier 13 can be referred to as a reverse amplifier 13 configured to establish signal communication from the second diplex filter to the first diplex filter 5. Accordingly, the first and second amplifiers 5 and 9 can facilitate bi-directional (e.g., "two-way") signal communication through the drop amplifier 104.

Each of the diplex filters 5 and 9, includes a high-pass filter between common port 4 and high-pass output 6 designed to conduct the downstream spectrum to the forward amplifier 7. Diplex filter 5 also includes a low-pass filter between common port 4 and low-pass output 12 to conduct upstream signals from the reverse amplifier to the CATV input 65. Diplex filter 9 is identical to diplex filter 5 having the same filter cut-off frequencies. High-pass port 8 receives downstream amplified signals and conducts them to the input of splitter 14 via common port 10. Low-pass port 11 delivers upstream signals to reverse amplifier 13 generated from devices connected to outputs 2 and 3 via the first and second outputs of splitter 14. In one or more non-limiting embodiments, the bi-directional amplifier 105 can provide a passive signal path in a first direction and an active signal path in a second direction opposite the first direction. For example, an upstream signal path for conducting the upstream signals can be configured as a passive signal path and a downstream signal path for conducting the downstream signals can be configured as an active signal path.

Figure 9:
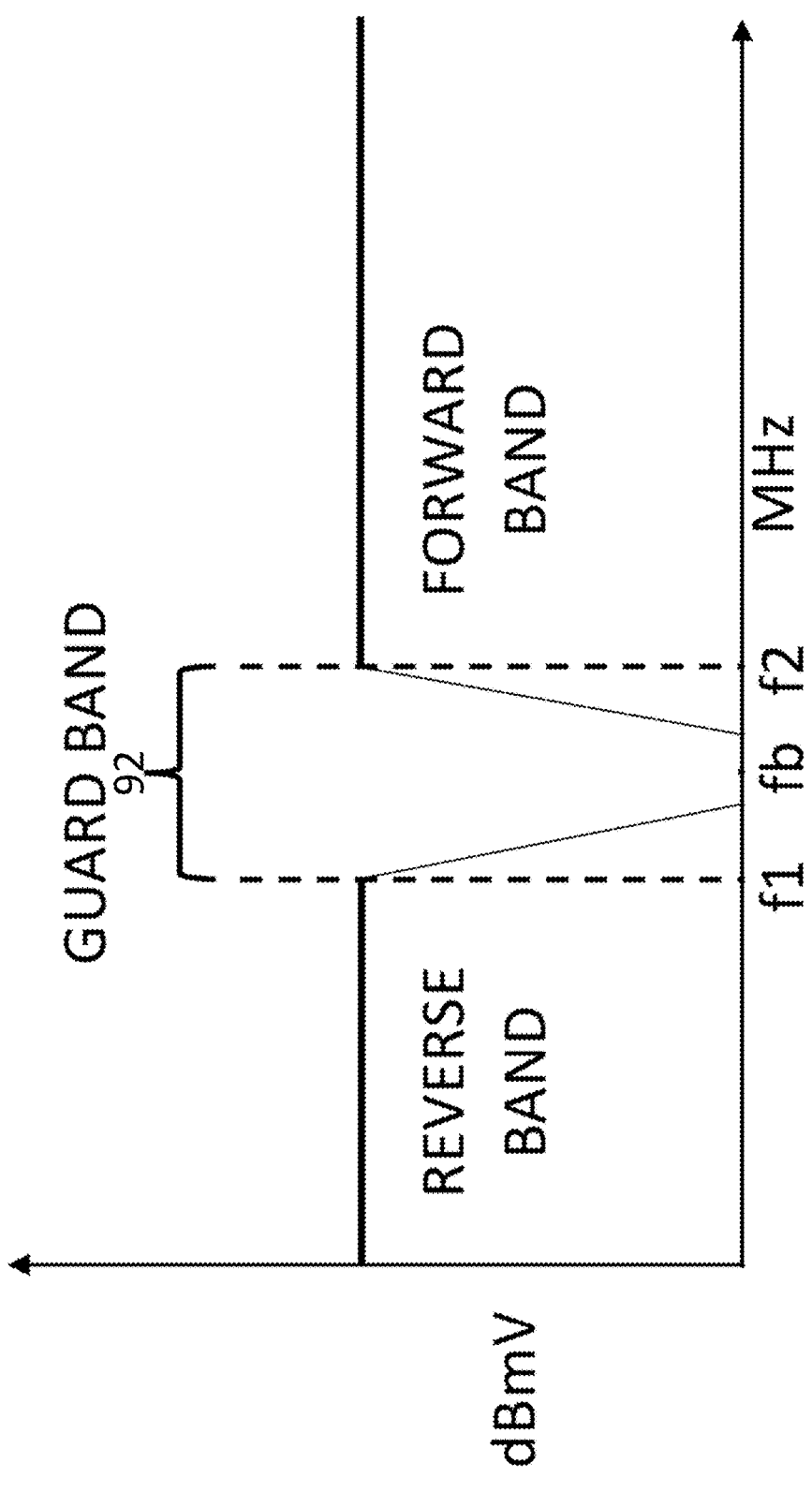
FIG. 9 is a signal diagram illustrating a guard band of an output signal transmitted from a provider equipment according to a non-limiting embodiment.

The bi-directional amplifier 105 is also configured to define the guard band in the output signal generated by the drop amplifier 104. For example, the inductive and capacitive components of each filter 5 and 9 ensure that the cut-off frequency of the low-pass filter 5 is lower than the cut-off frequency of the high-pass filter 9, thereby creating a guard band 92 in the output signal as illustrated, for example, in FIG. 9. Although a single guard band 92 is illustrated, it should be appreciated that the output signal can include several guard bands defined at different locations of the output signal. Signals in the guard band 92 cannot propagate through any of the output ports 67, 68 and 69 due to the arrangement of the diplex filters 5 and 9. Accordingly, the guard band 92 can be utilized to contain a pilot beacon signal 90 that identifies the drop amplifier 104 without affecting the performance or quality of the output signal transmitted through any of the output ports 67, 68 and 69 as described herein.

A first output 67 ("Output 1") of splitter 3 connects to the common port 4 of diplex filter 5. A second output of splitter 3 connects to the first output 67 via capacitor 27 and conductive path 26. The first output 67 is a passive connection to the CATV input generally allocated to a cable modem. Inductor 28 connects conductive path 26 to ground 23 for surge protection of the first output po 67 and tunes the high-pass cut-off frequency of the first output 67 below a target frequency, e.g., about 5 MHz. Inductor 28, conductive path 26 and capacitor 27 are exposed to signals conducted to and from the input port as well as radio frequencies generated by the ID beacon device 106 via antenna 24.

A second output 68 ("Output 2") is connected to splitter 14 via conductive path 17 and capacitor 15. Inductor 16 connects conductive path 17 to ground 23 for surge protection of the second output 68 and to tune the high-pass cut-off frequency of the second output 68 determined by the inductance of inductor 16 and capacitor 15 below a target frequency, e.g., about 5 MHz. Inductor 16, conductive path 17 and capacitor 15 are exposed to signals conducted to and from the second output 68 as well as radio frequencies generated by the beacon 106 via antenna 24.

A third output 69 ("Output 3") is connected to splitter 14 via conductive path 18 and capacitor 19. Inductor 20 connects conductive path 18 to ground 23 for surge protection of the third output 69 and to tune the high-pass cut-off frequency of the third output 69 determined by the inductance of inductor 20 and capacitor 19 below a target frequency, e.g., about 5 MHz. Inductor 20, conductive path 18 and capacitor 19 are exposed to signals conducted to and from the third output 69 as well as radio frequencies generated by the beacon 106 via antenna 24. More outputs can be added to the chain of splitters in like manner to increase the number of output ports.

DC power is provided to the power port and distributed to the forward and reverse amplifiers via conductive path 22. Capacitor 25 ensures that any radio frequencies present on path 22 are shunted to ground 23. The ID beacon device 106 can be connected to conductive path 22 to receive power. The antenna 24 can be positioned in proximity to the output ports such that the pilot beacon signal 90 radiates to paths 17, 18 and 26 (e.g., electrically excites paths 17, 18 and 26) and can be detected by monitoring equipment connected externally to any of the output ports 67, 68 and 69. In one or more non-limiting embodiments, a conductive element 49 such as, an electrically conductive trace 49 or electrically conductive coil 49, for example, can be connected to one or more of the output ports 67, 68 and 69. Accordingly, conductive traces 49 or electrically conductive coils 49 can increase the sensitivity at which the output ports 67, 68 and/or 69 are excited by the pilot beacon signal 90.

Figure 10:
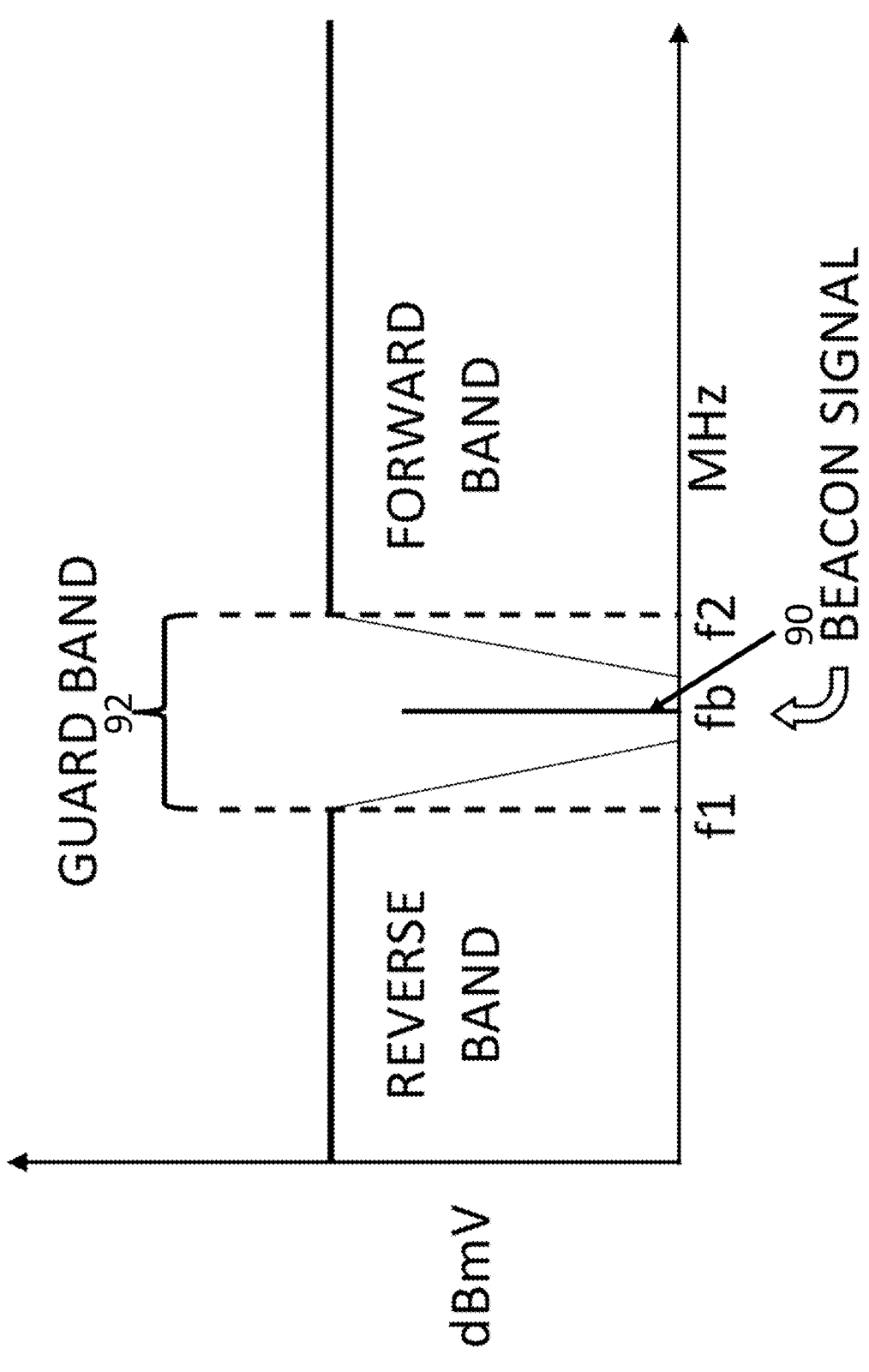
FIG. 10 is a signal diagram illustrating a pilot beacon signal generated by an ID beacon device and located in the guard band of the output signal shown in FIG. 9 according to a non-limiting embodiment.

As described herein, the ID beacon device 106 is configured to broadcast a pilot beacon signal 90, which is received wirelessly by one or more of the output ports 67, 68, 69. In one or more non-limiting embodiments, the pilot beacon signal 90 can be broadcast to every one of the output ports 67, 68 and 69. The pilot beacon signal 90 effectively radiates all of the output ports 67, 68 and 69, which in turn causes it to appear in the guard band 92 of the output signal as shown in FIG. 10. As described herein, the output signal can include additional guard bands located at different portions of the output signal. Therefore, one or more of the additional guard bands 92 can include a pilot beacon 90 located therein. Accordingly, the altered output signal transmitted through any of the output ports 67, 68 and 69 can be analyzed (e.g., by a beacon signal detection device 112) to detect the pilot beacon signal 90 and identify an aspect of the provider equipment 104 that is coupled to the beacon circuit 106.

As described herein, various non-limiting embodiments of the present teachings provide a provider equipment ID device comprising a provider equipment that includes an ID beacon device. The ID beacon device wirelessly broadcasts a detectable pilot beacon signal, which is indicative of the provider equipment and produces an alteration of the transmission or reflection at any port of a downstream device.

The provider equipment ID can be implemented in a provider equipment ID system, which includes pilot beacon signal detection unit configured to extract the pilot beacon signal from the altered output signal transmitted through any of the output ports of the provider equipment and can identify the provider equipment based on the extracted pilot beacon signal.

The teachings described herein may be implemented as a system, a method, and/or a computer program product at any possible technical detail level of integration. The computer program product may include a computer readable storage medium (or media) having computer readable program instructions thereon for causing a processor to control the system and/or perform the method.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry.

Aspects of the disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

Various computer readable program instructions including, but not limited to "Python," may be provided to a processor of a general purpose computer, special purpose computer, or other programmable data processing apparatus to produce a machine, such that the instructions, which execute via the processor of the computer or other programmable data processing apparatus, create means for implementing the functions/acts shown in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act shown in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts shown in the flowchart and/or block diagram block or blocks.

The flowchart and block diagrams in the Figures illustrate the architecture, functionality, and operation of possible implementations of systems, methods, and computer program products. In this regard, each block in the flowchart or block diagrams may represent a module, segment, or portion of instructions, which comprises one or more executable instructions for implementing the desired logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the desired functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A provider equipment identification (ID) device comprising:

a provider equipment including a plurality of output ports, the provider equipment configured to perform a signal processing operation on an input signal and to deliver an output signal to one or more of the output ports; and an ID beacon device coupled to the provider equipment, the ID beacon device configured to output at least one pilot beacon signal which is receivable by each of the output ports to electrically radiate each of the output ports such that the at least one pilot beacon signal is introduced in the output signal to generate an altered output signal.

2. The provider equipment ID device of claim 1, wherein the output signal includes at least one guard band and the at least one pilot beacon signal is located in the at least one guard band.

3. The provider equipment ID device of claim 2, wherein the ID beacon device further comprises:

an oscillator configured to generate a pulse signal;

a filter circuit coupled to the oscillator, the filter circuit configured to remove harmonics from the pulse signal and to output a filtered pulse signal in response removing the harmonics; and an antenna coupled to the filter circuit, the antenna configured to broadcast the at least one pilot beacon signal in response to receiving the filtered pulse signal.

4. The provider equipment ID device of claim 3, wherein the filter circuit is a low-pass filter including an input connected to the oscillator and an output connected to the antenna.

5. The provider equipment ID device of claim 3, wherein the filter circuit is a band-pass filter including an input connected to the oscillator and an output connected to the antenna.

6. The provider equipment ID device of claim 3, wherein the filter circuit is a ceramic resonator including an input connected to the oscillator and an output connected to the antenna.

7. The provider equipment ID device of claim 2, wherein the provider equipment further comprises a bi-directional amplifier configured to define the at least one guard band in the output signal.

8. The provider equipment ID device of claim 7, wherein the bi-directional amplifier comprises:

a first diplex filter coupled to with an input port of the provider equipment;

a second diplex filter coupled to with the output ports of the provider equipment;

a first amplifier coupled to between the first diplex filter and the second diplex filter in a first direction; and a second amplifier coupled to between the first diplex filter and the second diplex filter in a second direction opposite the first direction.

9. The provider equipment ID device of claim 8, wherein the signal processing operation includes amplifying the input signal.

10. The provider equipment ID device of claim 9, wherein the provider equipment includes a cable television (CATV) amplifier.

11. The provider equipment ID device of claim 1, wherein the ID beacon device is configured to wirelessly broadcast the at least one pilot beacon signal.

12. The provider equipment ID device of claim 11, wherein the at least one pilot beacon signal is wirelessly receivable by each of the of the output ports.

13. The provider equipment ID device of claim 1, further comprising an electrically conductive element coupled to at least one of the output ports, the electrically conductive element configured to increase a signal sensitivity of the at least one output port.

14. The provider equipment ID device of claim 1, wherein the at least one pilot beacon signal is modulated to indicate information corresponding to one or more characteristics of the provider equipment.

15. A provider equipment identification (ID) device comprising:

a provider equipment including a plurality of output ports, the provider equipment configured to perform a signal processing operation on an input signal and to deliver an output signal to one or more of the output ports, wherein the output signal includes at least one guard band; and an ID beacon device coupled to the provider equipment, the ID beacon device configured to output at least one pilot beacon signal which is receivable by each of the output ports to electrically radiate each of the output ports such that the at least one pilot beacon signal is introduced in the output signal to generate an altered output signal, wherein the at least one pilot beacon signal is within the at least one guard band and wherein the at least one pilot beacon signal is encoded to indicate at least one characteristic of the provider equipment.

16. The provider equipment ID device of claim 15, wherein the provider equipment includes a main circuit coupled to a power supply, and wherein the ID beacon device is coupled to the power supply but is separate from the main circuit.

17. The provider equipment ID device of claim 15, wherein the at least one at least one pilot beacon signal includes a plurality of pilot beacon signals.

18. The provider equipment ID device of claim 17, wherein the plurality of pilot beacon signals includes a first pilot beacon signal located at a first position in the at least one guard band and a second pilot beacon signal located at a second position in the at least one guard band different from the first position.

19. The provider equipment ID device of claim 18, wherein the at least one guard band includes a plurality of guard bands, and wherein a first guard band among the plurality of guard bands includes a first pilot beacon signal among the plurality of pilot beacon signals and second guard band among the plurality of guard bands includes a second pilot beacon signal among the plurality of pilot beacon signals.

20. A cable television (CATV) amplifier identification (ID) device comprising:

a drop amplifier comprising:

an input port configured to receive an input signal;

a passive output port coupled to the input port to receive the input signal; and a bi-directional amplifier including an amplifier input coupled to the input port and the passive output port, and an amplifier output coupled to the one or more active output ports; and an ID beacon device coupled to the drop amplifier, the ID beacon device configured to wirelessly broadcast at least one pilot beacon signal which electrically radiates the one or more active output ports.

21. The CATV amplifier ID device of claim 20, wherein the output signal includes a media portion containing media data, and wherein the at least one guard band is excluded from the media portion of the output signal.

* * * * *